UNITED STATES PATENT OFFICE.

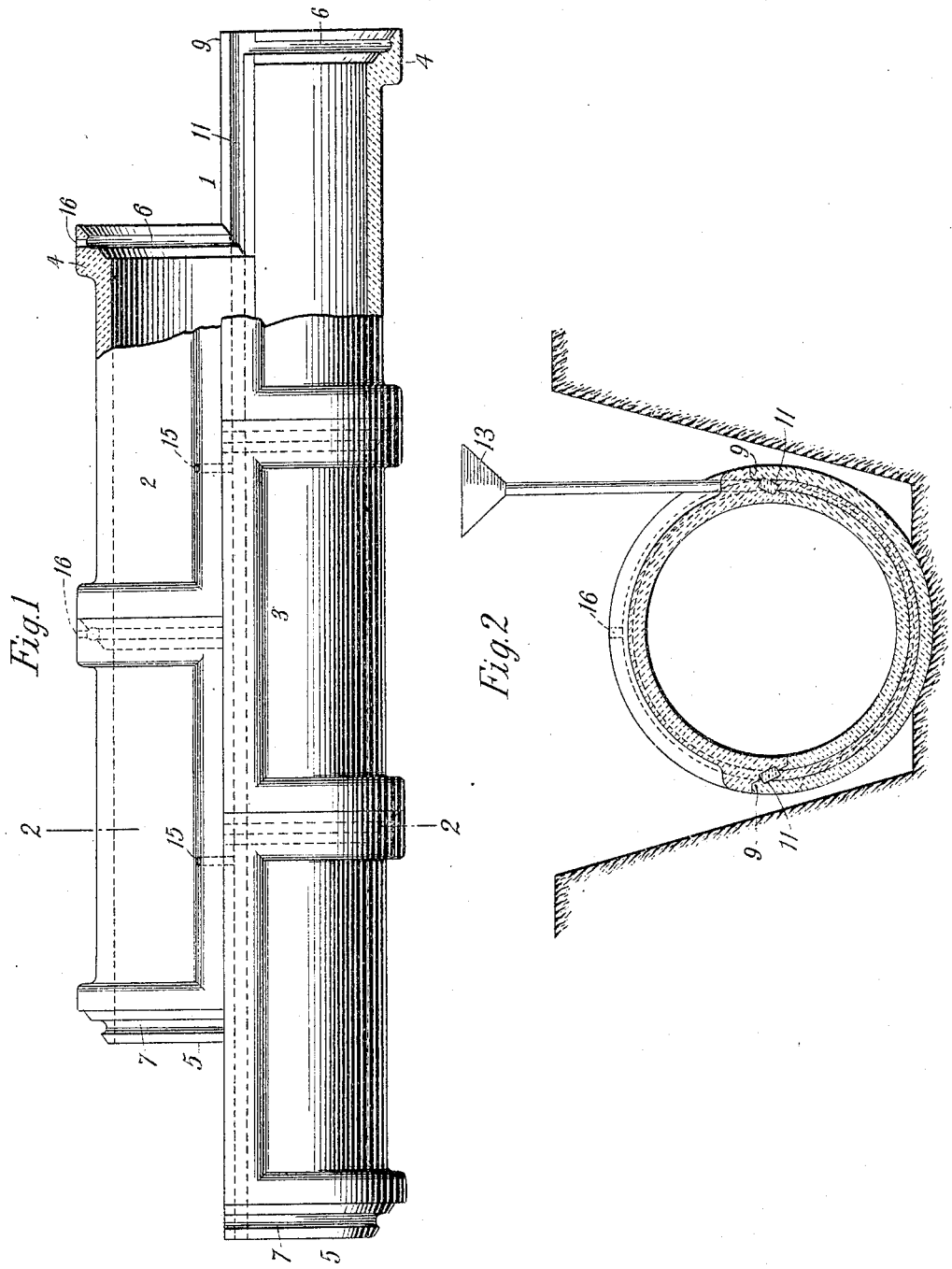

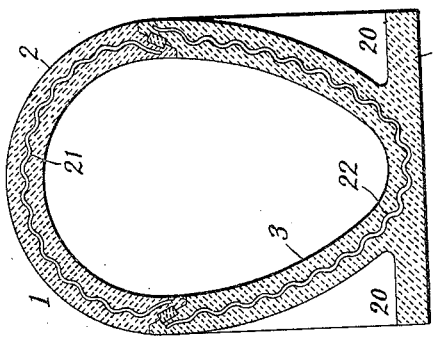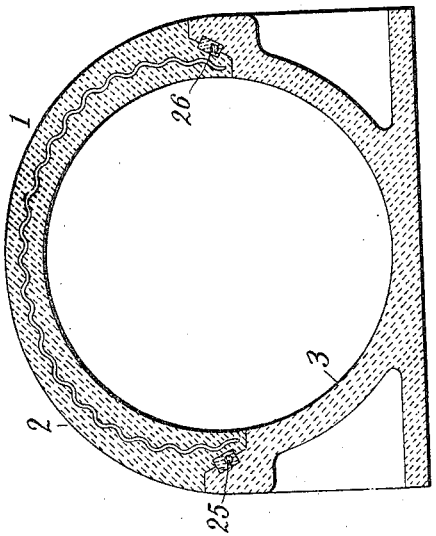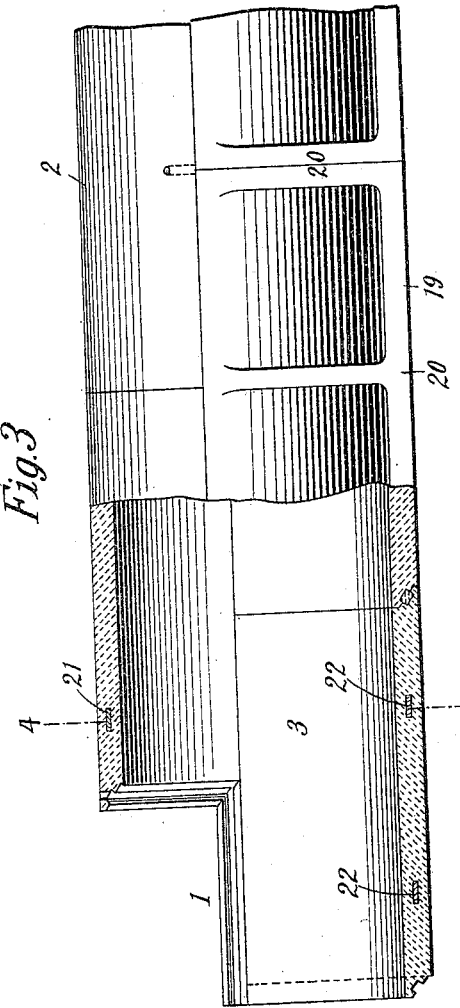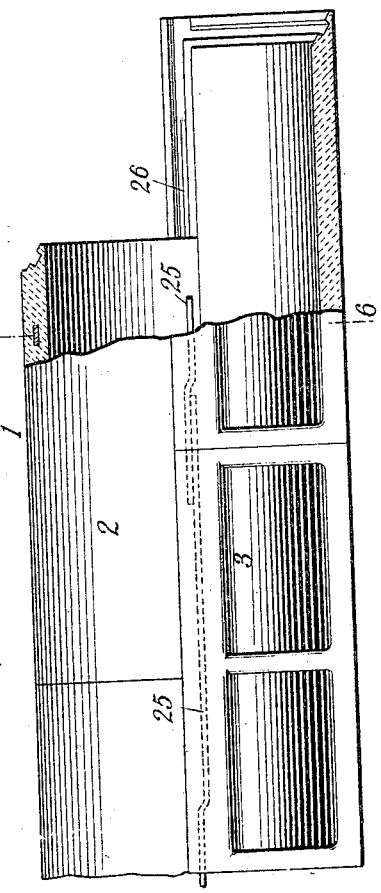

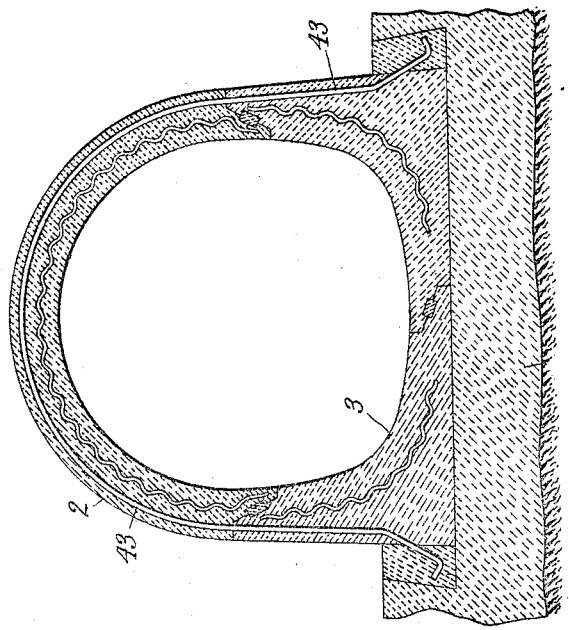
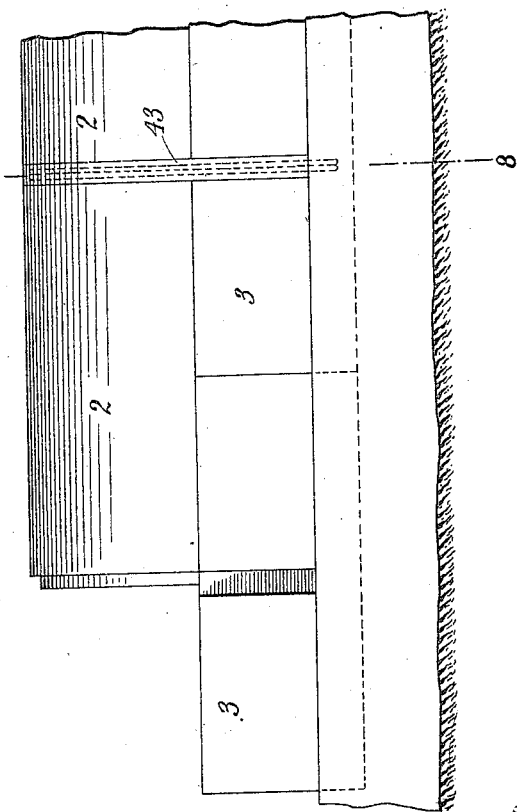

PHILIP AYLETT, OF PORTSMOUTH, VIRGINIA.

PIPE OR CONDUIT.

No. 798,486. Specification of Letters Patent. Patented Aug. 29, 1905.

Application filed May 4, 1905. Serial No. 258,771.

*To all whom it may concern:*

Be it known that I, PHILIP AYLETT, a citizen of the United States, residing at Portsmouth, in the county of Norfolk and State of Virginia, have invented certain new and useful Improvements in Pipes or Conduits, of which the following is a specification, reference being had to the drawings accompanying and forming a part of the same.

The invention which forms the subject of my present application is a novel pipe or conduit which by reason of its comparative cheapness, the ease and rapidity with which it may be constructed, even in very large sizes, and its capacity for withstanding strains to which such pipes are likely to be subjected under conditions of use constitutes a useful improvement in the art. These advantages are secured by a new plan of construction and the introduction of certain novel details which will be more fully hereinafter set forth.

My invention applies more particularly to pipes or conduits composed of cement or similar material and will be described as such, although the material is not an essential feature of the invention.

My improved pipe or conduit is made up of units, each consisting of a longitudinal half, more or less, of a section of pipe of any desired cross-section. It is of course not material, except perhaps in a practical sense, that each unit should constitute exactly or even approximately one-half of a section, as it might be some other fractional part; but it is sufficient for the purposes of the present case to consider only that embodiment of the invention in which the units constitute either the upper or the lower half of a pipe-section. The units are molded or formed with ends and edges which are adapted when the pipe is assembled to form scarf-joints. For this purpose the longitudinal edges are properly beveled, while the abutting ends of adjacent units or sections have a bell-and-spigot conformation, respectively. In the beveled faces, both at the ends and along the edges, moreover, there are formed grooves which provide spaces serving as ways for the insertion of keys for locking the units together. As the grooves are continuous in the sense that the transverse grooves at the ends of the sectional units extend from the longitudinal groove along one edge to that at the other, the keyways at the ends of the sections communicate directly with those at the edges. The pipe or conduit is built by laying any desired number of these units in a trench or upon a proper foundation and inserting the tapered or spigot end of one into the bell end of the other in the usual way. Over these sections the corresponding upper units are laid, but so as to break joint with the under sections. The pipe is completed by filling the keyways with a material, such as cement, which is run into the keyways of any number of assembled sections in a semifluid or plastic state and allowed to set or harden, thus forming a calking for the joints as well as a key for locking the contiguous edges and ends of the pipe-sections securely together. The construction thus generally described is capable of various modifications within the scope of the invention, as will be illustrated by reference to the accompanying drawings.

Figure 1 is a side elevation, partly in section, of a portion of a conduit constructed in accordance with my invention. Fig. 2 is a transverse sectional view on the line 2 2 of Fig. 1. Fig. 3 is a side elevation, partly in section, illustrating a modification of the invention in which the pipe is provided with a flat base and the units are reinforced by strips of metal embedded therein. Fig. 4 is a sectional view on the line 4 4 of Fig. 3. Fig. 5 is a side elevation illustrating another modification of the invention in which the pipe is reinforced and the units tied together by longitudinal key-rods. Fig. 6 is a sectional view on the line 6 6 of Fig. 5. Fig. 7 is a side elevation, partly in section, of a portion of a conduit reinforced by transverse bands and tied together by longitudinal rods. Fig. 8 is a transverse sectional view on line 8 8 of Fig. 7.

The pipe or conduit 1 is composed of the longitudinally-separable units 2 and 3, which differ from each other only with respect to such minor details as are necessary to adapt them for use, respectively, in the upper and lower portions of the pipe. The longitudinal edges 9 of each unit are beveled to any desired angle, so that when laid one upon the other they will constitute a scarf-joint. In the beveled faces of such edges grooves 11 are formed, which when the units are assembled form longitudinal ways for the reception of keys to lock the contiguous units together. In a similar manner the opposite ends 4 and 5 of each sectional unit are given a bell-and-spigot conformation with beveled meeting edges containing grooves 6 and 7, which form ways for keys which unite the units end to end. The ends and edges of each unit are made of such thickness, as shown in Fig. 1, that the surfaces of separate sections along all contiguous edges will be flush. This thickening of the edges reinforces the pipe and effects a saving of material; but of course when this is not a desideratum the entire unit may be of the thickness required for the joints.

In building a line of pipe for water, sewage, or electric conductors a trench or other suitable foundation is prepared in or upon which any desired number of the units are laid to form the lower portion of the conduit, the spigot end of one being inserted in the bell end of that next adjacent. Upon these other units are laid to form the upper portion of the conduit, these ends being similarly matched, but care being taken that the upper series of units shall break joint with those below. As the pipe is thus formed the calking and locking of the joints is effected by filling the keyways with a material, such as cement, which may be run in or otherwise applied to the same in a semifluid or plastic condition. The precise manner of applying such a key is not an essential part of my present invention; but the peculiar construction of pipe which I have devised renders it possible to both calk and lock any number of assembled sections at a single operation, as will be seen from the following considerations: The transverse grooves 6 and 7 at the ends of the sectional units connect the longitudinal grooves 11 at the opposite edges. There is thus formed when the nuts are assembled a series of communicating keyways or spaces. This feature may be taken advantage of by forcing into the keyways from one point the cement or other material in a semifluid or plastic condition necessary for completing a considerable length of pipe, or, if so desired, ducts 15, opening into the longitudinal keyway of each section, and ducts 16, opening into the top of each transverse keyway, may be utilized and the cement run in by means of a funnel 13 as the units are assembled. By lengthening the funnel any desired pressure may be secured for this operation; but in any case the cement should be run in, so as to completely fill the entire keyways or spaces of all the units laid.

It is obvious that the pipe may be made with any cross-sectional form that will best adapt it to the particular use to which it is to be applied. In Figs. 3 and 4 I have shown a form which is largely used for sewers, and when the conduit is to be of large size it may be desirable to mold the lower units with a broad base 19 and side supports or wings 20 to give the pipe-line greater strength and afford a more stable foundation. In these figures I have also shown metal strips 21 22 embedded in the cement for the purpose of reinforcing the pipe.

In Figs. 5 and 6 I have illustrated a pipe of approximately circular form with a supporting-base and side flanges and an additional feature which serves to impart greater rigidity to a pipe-line and to more securely bind the elements together. This latter consists of metal rods or bars 25 26, which are passed into the longitudinal keyways and which are of such size that they do not completely fill these spaces, but leave room for the introduction of a sufficient amount of semiliquid cement to effect a seal and embed the bars. These rods or bars are also inserted so that their ends overlap to some extent, and as they extend across the joints between adjacent units they serve to tie the same together and impart rigidity to the pipe as a whole.

I have described the units of the pipe as being formed with ends and edges that form "scarf-joints;" but I do not intend by the use of this term to limit the degree to which the meeting surfaces are to be beveled or the peculiar conformation to be given to them, as any form of joint which may be perfected by a key or its equivalent will or may serve the same purpose. An ordinary scarf-joint imparts great resisting power to internal pressure in a pipe; but should this not prove sufficient for the purpose I may reinforce the pipe by transverse bands of metal 43 surrounding it, as shown in Figs. 9 and 10.
When such bands are employed, it will generally be because of the large size of pipe required, in which event it will be advantageous to apply to the pipe after it has been completed a layer of cement, which may be utilized to afford an anchorage for the transverse bands.

It will be understood that my improved pipe or conduit may be used for any purpose for which such devices are employed. It is particularly useful, in addition to the purpose herein specified, as a casing for piles exposed to the attacks of marine insects, or for steel or iron girders as a protection, or for fireproofing and other purposes.

I am aware that tubular structures, including pipes, have been provided in some instances with keyways within the joint at the ends for the reception of a key, such as lead or cement introduced while in a semifluid or plastic state, and in other instances with butt-joints along the longitudinal edges of separate sections containing keyways for the insertion of bars or other rigid keys. I am further aware that conduits have been constructed of longitudinally-separable sectional units and that such units have been in some cases provided with interlocking longitudinal edges rendered effective by sliding one unit longitudinally into engagement with another. In general such units have been assembled so that the upper sections break joint with the lower. My invention as above described, however, enables me to construct a conduit in which all the units are interlocked and calked in a more simple and effective manner.

Moreover, the construction which I have devised permits me to lay the lower portion of a conduit in any length before inclosing it a straight and even to deviate slightly from a straight line in laying the under portion without rendering it difficult to set the upper units in place.

What I claim as my invention is—

1. A pipe or conduit composed of laterally and longitudinally separable sectional units, with ends and edges adapted to form scarf-joints and provided with grooves along the contiguous faces of said joints to form keyways when the units are assembled, and keys in the transverse and longitudinal keyways composed of a set or hardened material adapted to be introduced into said keyways in a semifluid or plastic state, as set forth.

2. A pipe or conduit composed of laterally and longitudinally separable sectional units with ends adapted to interlock and edges forming scarf-joints and provided with grooves along the contiguous faces of said joints to form keyways when the units are assembled, and keys in the same composed of a set or hardened material adapted to be run into the keyways in a semifluid or plastic state, as described.

3. A pipe or conduit composed of laterally and longitudinally separable sectional units provided at the ends and edges with scarf-joints containing communicating keyways adapted to receive a semifluid or plastic material which, on setting or hardening, forms a key, as set forth.

4. A pipe or conduit composed of laterally and longitudinally separable sectional units, assembled so as to break joint transversely, the said units having ends and edges adapted to form scarf-joints and containing continuous grooves therein which form communicating keyways when the units are assembled, adapted to receive a material in a semifluid or plastic state which, after setting or hardening, forms a key for locking the units together, as set forth.

5. The unit for pipe construction herein described, consisting of a longitudinal half, more or less, of a pipe-section having its ends and edges beveled to form scarf-joints with adjacent sections and provided with a continuous groove extending along its ends and edges in the beveled faces of the same to form a keyway in said joints, as set forth.

6. A pipe or conduit composed of laterally and longitudinally separable sectional units with ends and edges adapted to form scarf-joints and containing grooves along the contiguous faces of said joints which form keyways when the units are assembled, and provided with ducts communicating with such keyways to permit a key to be introduced therein in a semifluid condition.

7. A pipe or conduit composed of laterally and longitudinally separable sectional units with ends and edges adapted to form scarf-joints and provided with grooves along the contiguous faces of said joints which form keyways when the units are assembled, a set or solidified material which is adapted to be introduced in a semifluid or plastic state filling said keyways, and rigid rods or bars embedded in the said material in the longitudinal keyways, as set forth.

8. A pipe or conduit composed of laterally and longitudinally separable sectional units with ends and edges adapted to form scarf-joints and provided with grooves along the contiguous faces of said joints which form keyways when the units are assembled, a plastic material contained in said keyways and forming a key, rigid bars or rods embedded in the material in the longitudinal keyways and having overlapped ends for tying the sectional units together, as set forth.

9. A pipe or conduit composed of laterally and longitudinally separable sectional units, having ends and edges adapted to form scarf-joints when assembled, and locked by a continuous key of solidified or set plastic material reinforced by metal rods or bars embedded in said material and extending across the joints, as set forth.

10. A pipe or conduit composed of laterally and longitudinally separable sectional units having ends and edges adapted to form scarf-joints when assembled, and locked by a continuous key of solidified or set plastic material, and transverse tie-bands surrounding the pipe for reinforcing it against lateral pressure, as set forth.

11. A pipe or conduit composed of laterally and longitudinally separable sectional units having scarf-joints locked by a key of solidified or set plastic material extending along the said joints, metal rods or bars embedded in the longitudinal keys and extending across the joints between adjacent units and transverse tie-bands surrounding the pipe and reinforcing it against lateral pressure, as set forth.

PHILIP AYLETT.

Witnesses:
M. LAWSON DYER,
JOHN C. KERR.